Figure 1:
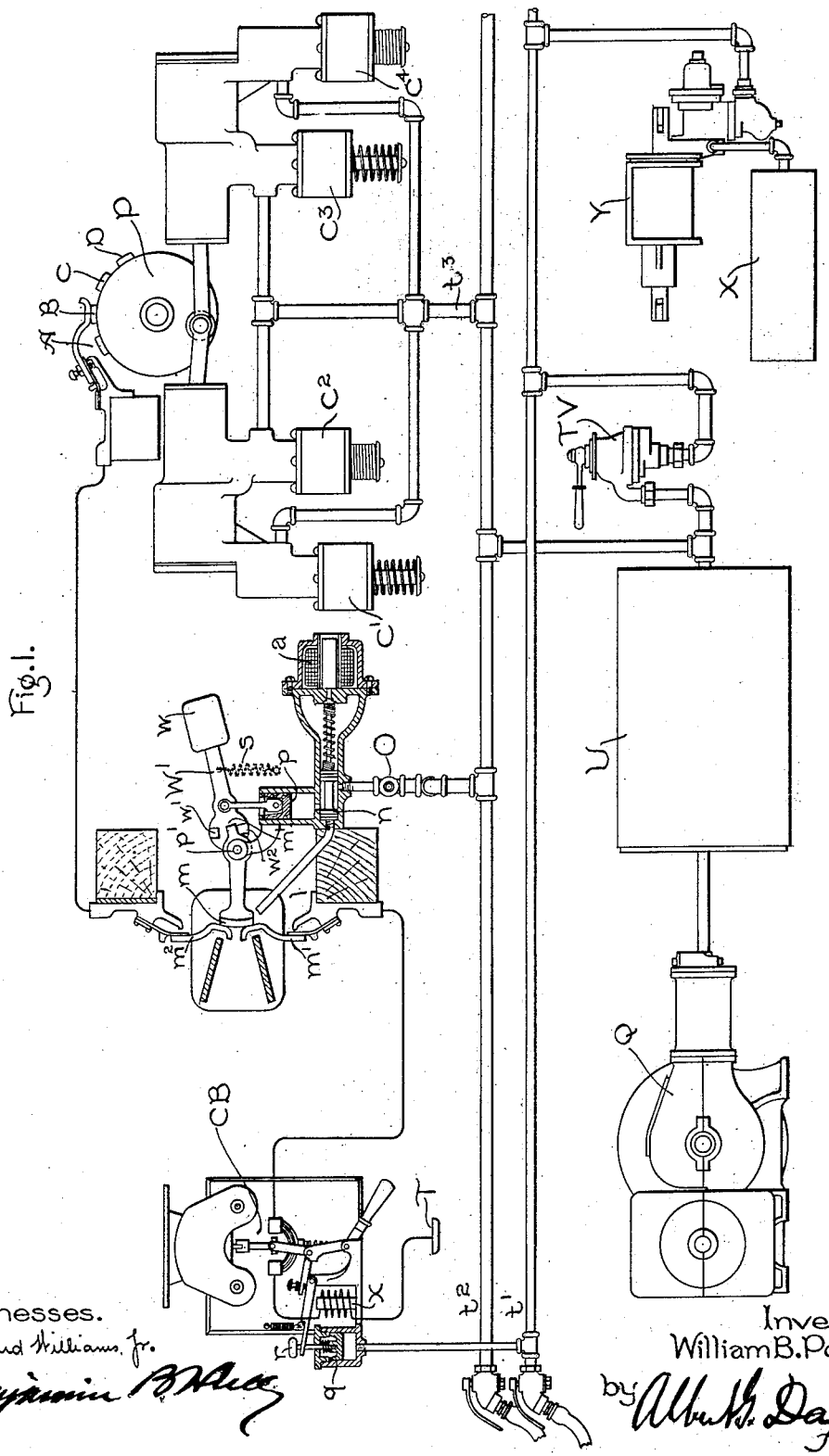

No. 715,291. Patented Dec. 9, 1902.
W. B. POTTER.
SYSTEM OF CONTROL FOR ELECTRICALLY PROPELLED VEHICLES.
(Application filed Apr. 8, 1899.)
(No Model.) 4 Sheets—Sheet 1.

Witnesses.
Edward Williams, Jr.

Inventor:
William B. Potter,
by Albert G. Davis
Atty.

Witnesses.
Edward Williams, Jr.
Benjamin B. Hull

Inventor.
William B. Potter,
by Albert G. Davis
Atty.

No. 715,291. Patented Dec. 9, 1902.
W. B. POTTER.
SYSTEM OF CONTROL FOR ELECTRICALLY PROPELLED VEHICLES.
(Application filed Apr. 8, 1899.)
(No Model.) 4 Sheets—Sheet 3.
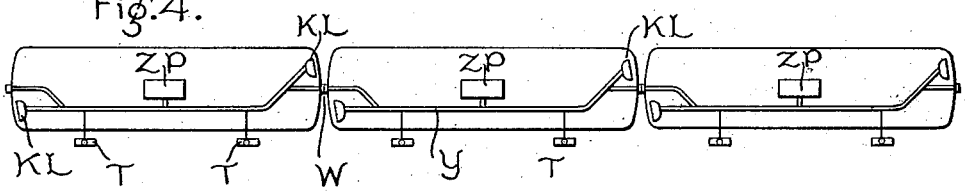
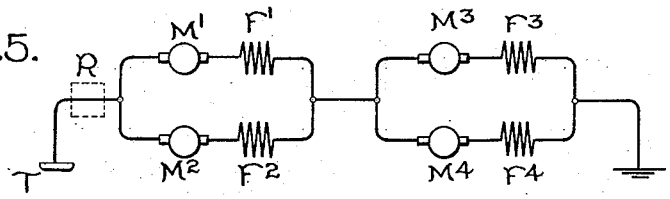
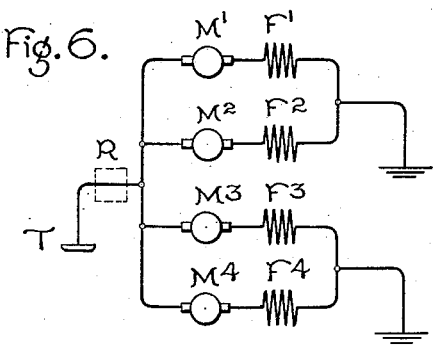
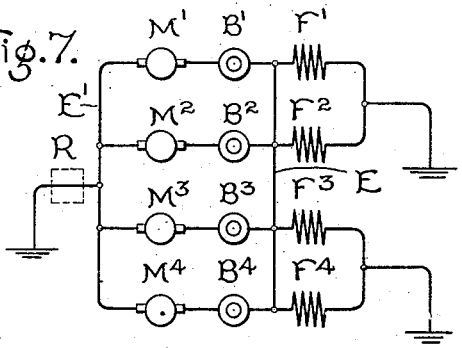
Witnesses.
Edward Williams, Jr.
Benjamin B. Hull
Inventor.
William B. Potter.
by Albert G. Davis
Atty.

No. 715,291. Patented Dec. 9, 1902.
W. B. POTTER.
SYSTEM OF CONTROL FOR ELECTRICALLY PROPELLED VEHICLES.
(Application filed Apr. 8, 1899.)
(No Model.) 4 Sheets—Sheet 4.

WITNESSES.
A. H. Abell.
A. F. Macdonald.

INVENTOR.
William B. Potter,
by Albert G. Davis
Atty.

UNITED STATES PATENT OFFICE.

WILLIAM B. POTTER, OF SCHENECTADY, NEW YORK, ASSIGNOR TO THE GENERAL ELECTRIC COMPANY, A CORPORATION OF NEW YORK.

SYSTEM OF CONTROL FOR ELECTRICALLY-PROPELLED VEHICLES.

SPECIFICATION forming part of Letters Patent No. 715,291, dated December 9, 1902.

Application filed April 8, 1899. Serial No. 712,220. (No model.)

*To all whom it may concern:*

Be it known that I, WILLIAM B. POTTER, a citizen of the United States, residing at Schenectady, in the county of Schenectady, State of New York, have invented certain new and useful Improvements in Systems of Train Control for Electrically-Propelled Vehicles, of which the following is a specification.

My invention relates to the control of vehicles equipped with electric motors, particularly to that type in which the motors are also used in well-known ways as braking-generators.

It is one of the objects of the invention to combine electrically-equipped vehicles, each of which constitutes a unit capable of efficient individual operation, into trains comprising a greater or less number of vehicles, the train as a whole being capable of control from one or more points. While this general plan of operation is old, the method of obtaining the desired results, as well as the arrangement of the apparatus and many of its particular features, I believe to be new with me.

The system comprises, briefly, controlling devices or motor-controllers operated by fluid-pressure, although electromagnetically controlled and themselves controlling the changes in the motor-circuits while the train is being driven and in the brake-circuits while it is being retarded. The operation of the motor-controllers is governed manually by means of an electric controlling system supplied with current from any desired source, although it is manifest that the line-current will ordinarily be employed. The said regulating system comprises electromagnets for controlling the supply of fluid-pressure, together with suitable connections, to a controlling device or master-controller or to a plurality of such devices, from any one of which the controlling-switches may be operated. In the drawings I have shown this master-controller as comprising two distinct master-switches—one for controlling the power-circuit and one for regulating the braking connection of the motors. This arrangement is shown merely for convenience in illustration, as ordinarily the power and braking switches would be embraced in a single piece of apparatus with either one or two sets of moving contacts, as the engineer may prefer. A third master-switch for controlling the relation of the motor-circuits is also provided.

A feature of my present invention is the regulation of the entire electrical system both for power and brake in the manner indicated.

In many cases railroads having cars with air-brakes are converted into electric roads. It is not desirable to remove the air devices, at least until familiarity with electrical equipment is acquired. It may even be preferred to retain them permanently either for regular use or for occasional emergencies, such as may arise from accident to electric brake apparatus. In such cases reliance upon hand-brakes would usually be impossible. To provide for thus utilizing air-brakes in connection with electric devices is another object of the present invention. It is desirable that the two classes of apparatus should be so combined that improper manipulation shall be as far as possible prevented. To attain this end, I so connect the electric parts to the air-brake that until the air-pressure rises to a certain critical point the motor-circuit will not remain closed, so that any continuous running before the air-brake is available is not possible. At the same time the engineer might by holding the circuit-breaker closed by hand move his train for a short distance, this sometimes being desirable immediately after a train is "made up" and before the pressure has risen to the normal.

As another feature of the system herein disclosed I use the air-pressure to operate a commutating-switch by which the relations of the motor-circuits are varied. This switch is provided with four rows of contacts, respectively coupling the motors so that they drive the train forward or back or apply the brakes in either direction. It therefore comprises a power-brake switch for properly connecting the motors to operate as propelling-motors or as braking-generators and also a reversing-switch. The valves which regulate the fluid-pressure to move the commutating-switch are themselves controlled by electromagnets in an electrical controlling system. As the various switches which I employ to regulate the different electromagnetically-controlled contacts do not at any time carry the motor-current, they may be made of small size and easy to operate. The only switches which must be heavy enough to carry the motor-current are the commutating-switch and the controlling-switch or motor-controller, and both of these are operated by air-pressure. While the commutating-switch is preferably arranged to connect the motors for rotation in either direction and also to connect them for braking in either direction of motion, it may evidently be arranged to perform only one of these functions, or it may be arranged to make other desired changes in the motor-circuit.

Figure 2:
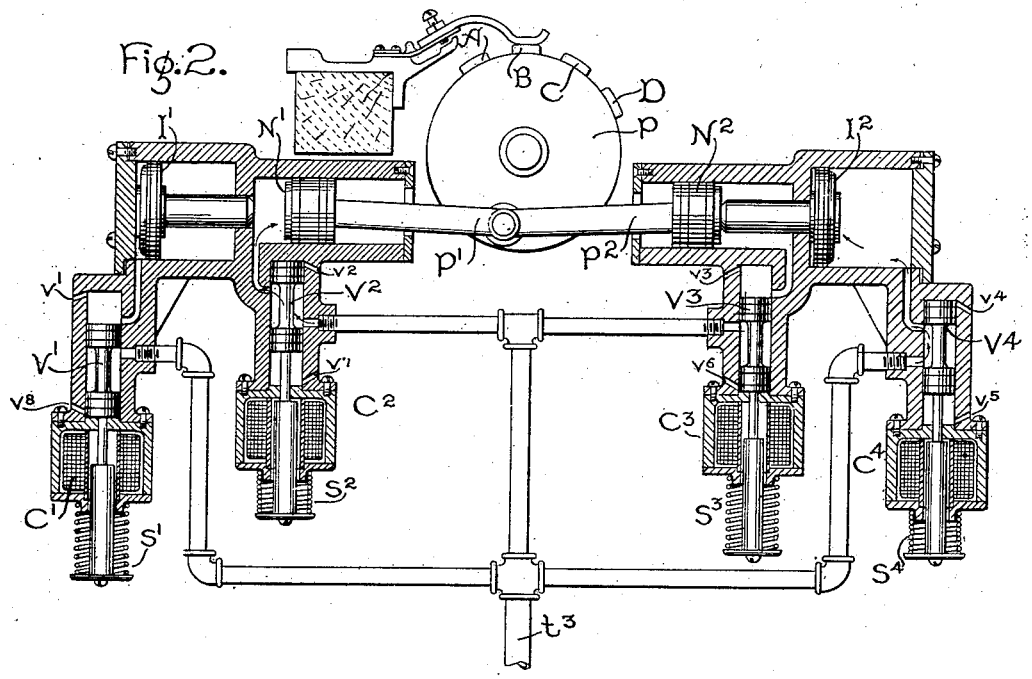
Figure 3:
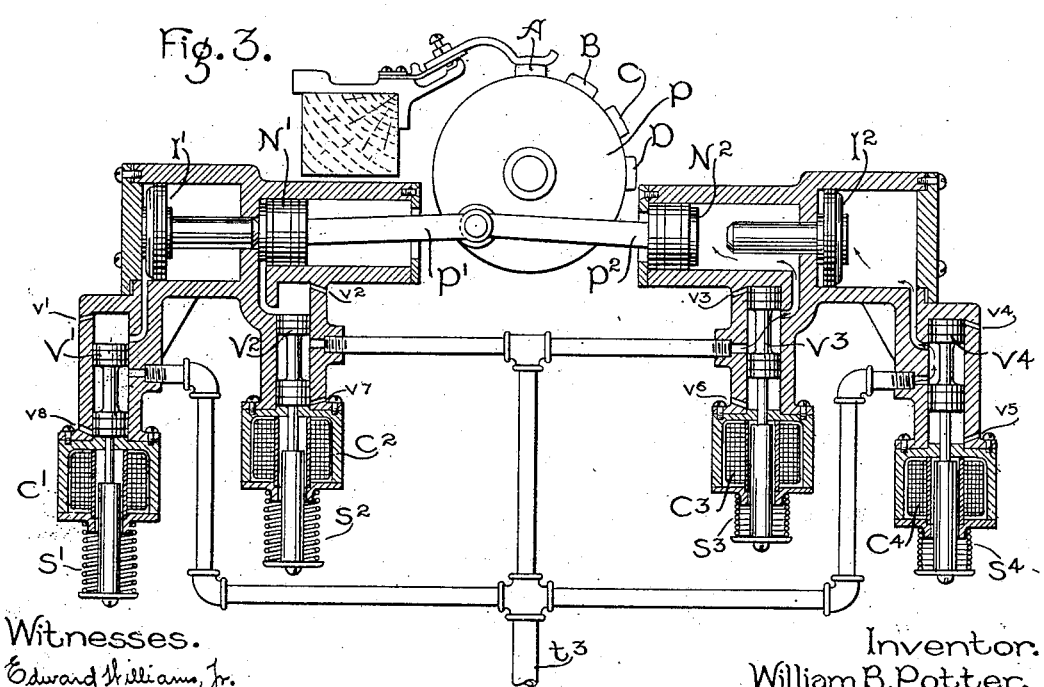
Figure 8:
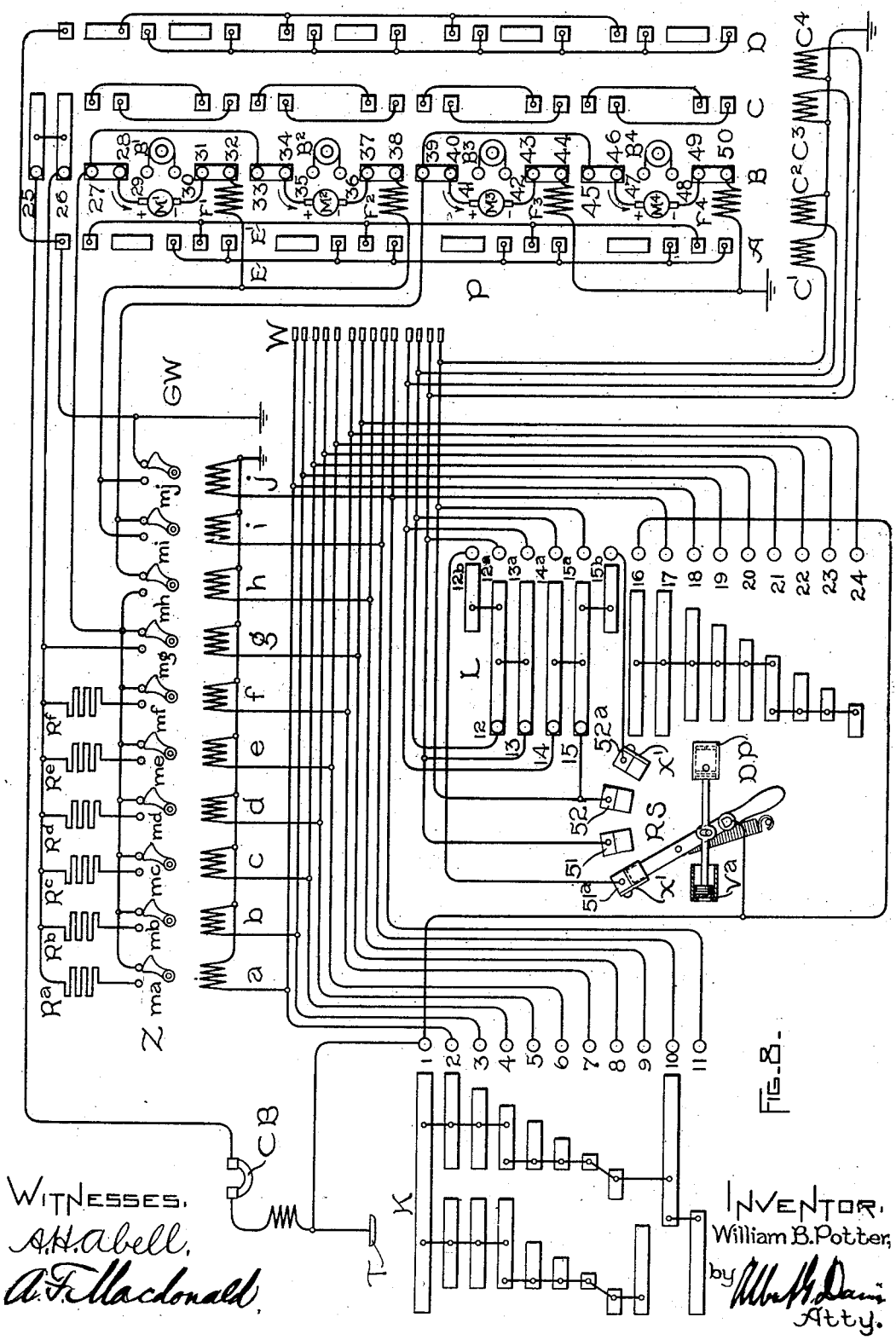

Figure 1 is a general view of the apparatus employed in operating the system described. Figs. 2 and 3 are enlarged views, partly sectional, showing the arrangement of the fluid-pressure valves by which the commutating-cylinder is actuated, the cylinder being shown in two positions. Fig. 4 is a diagrammatic plan of a train equipped according to my invention. Figs. 5, 6, and 7 illustrate the motor combinations in the power and brake positions of the commutating-cylinder. Fig. 8 is a general view of the circuits of the apparatus.

In Fig. 1, Q is the motor operating the air-compressor, which feeds directly into the train-reservoir U. Y is the usual brake mechanism, with an auxiliary reservoir X. Of course there is one of the latter upon each car connected in the usual way to the train-reservoir U, so that an ample supply of air-pressure is at all times afforded upon each motor-car for the operation of its controlling mechanism. The air-pressure being thus localized, the operation of the different parts is effectively and practically simultaneously controlled. TV represent the engineer's valve, usually located in the engineer's cab, for the air-brake mechanism. $t'$ $t^2$ are the train-pipes. These parts are of the usual and well-known construction and will not be further described. It is to be understood that any suitable form of governor, automatic or otherwise, may be provided for the motor operating the air-compressor. The upper part of the drawing illustrates the combination of electrical and mechanical devices, the latter being operated by fluid-pressure, which constitutes the principal part of my invention. T is the point of entrance of current. It is represented as the usual sliding shoe of the third-rail system, but may be a trolley or any other form of collecting device. Current passes from this to a circuit-breaker CB, provided with a series coil $x$ and operated automatically by overload in the usual manner. The tripping-lever of the circuit-breaker is controlled by the pressure in the air-brake system, so that it operates to maintain the circuit-breaker in its closed position only when the pressure in the air-brake system is in excess of a certain critical pressure. The circuit-breaker is actuated through the tripping device by means of a pneumatic device, consisting of a piston $q$ and rod $r$, having an enlargement on its upper end connected to the tripping-lever of the circuit-breaker. The piston $q$ is sustained against the power of the spring by the pressure in the train-pipe. If the air-brakes be applied so that the pressure falls, the tripping-lever of the circuit-breaker will be pulled down and the circuit will be opened. Of course the action will take place if the pressure drops for any other reason—as, for example, in case of the breaking of the train-pipe. Current passes through the circuit-breaker to the series of contacts controlling the changes in the motor-circuits. Each member of the series comprises contacts $m'$ $m^2$, which are bridged by the lever-contact $m$. This contact is actuated by the piston $p$ against the force of the weight $w$. The cylinder is connected to the pipe $t^2$ as a source of pressure, and a valve O is provided, by which any contact which may prove defective may be cut out. The valve $n$—a piston-valve of the usual balanced form—is controlled by the solenoid $a$ acting against a compression-spring, as shown. A pipe $l$ is connected to the cylinder within which the valve $n$ plays. The operation of these parts is as follows: When the coil $a$ is energized, the solenoid-core is drawn to the left to the position shown. The valve $n$ opens a connection to the piston $p$, and contact $m$ is actuated to bridge the contacts $m'$ $m^2$. In the practical operation of the device it is desirable that the contact $m$ should be moved quickly when the circuit is broken, so that arcing may be diminished. In order to accomplish this result and to permit a firm pressure on the spring-contacts, so as to insure good electrical connection, I find it desirable to have these contacts opened and closed by a sudden impulse or hammer-blow. The arrangement shown in Fig. 1 is one of a number which may be adopted for this purpose. In that, there is a lost-motion connection between the arm or lever carrying the contact $m$ and the piston $p$. The piston $p$ is connected to the lever W', which is pivoted at $p'$ and provided with a pair of lugs $w'$ $w^2$, with which a toe $m'$ on the contact-lever $m$ may engage, the contact-lever being also pivoted at $p'$. A weight W is on the outer end of lever W'. When the piston $p$ is moved in either direction, one or the other of the lugs $w'$ $w^2$ will as the weight is thrown in one direction or the other suddenly engage with the toe $m'$ and snap the contact $m$ into or out of engagement with the spring-terminals. Where the weight W may more conveniently hang vertically, a spring $s$ (shown in dotted lines) may also be attached to the lever; but ordinarily this will not be necessary. When the circuit of the coil $a$ is opened, the valve $n$ is carried back, so as to close the connection from the pipe $t^2$ and leave open the vent in the bottom of the cylinder, thus also uncovering the pipe $l$. Weight W then pulls down the lever $m$, and the exhaust from the cylinder delivers a blast of air across the contacts sufficient to extinguish the arc made by opening the circuit. From the controlling-contacts current passes to the commutating-cylinder P. The position of this cylinder is controlled by the coils $C'$ to $C^4$, the operation of which will be more readily understood from Figs. 2 and 3. In these latter figures it will be seen that the commutating-cylinder P is provided with four rows of contacts A, B, C, and D. These respectively connect the motors for braking and power positions in forward and reverse directions. The inner rows B C correspond to the power positions and A D to the brake positions. The electrical connections will be described with reference to Fig. 8. The mechanical arrangements by which the fluid-pressure actuates the commutating-cylinder are as follows: The coils $C'$ to $C^4$, respectively, control the piston-valves $V'$ to $V^4$, which are of the balanced type. The pressure is admitted to the valve-chambers from the pipe $t^3$ in accordance with the position of these valves as determined by the coils. Each of the valves controls the movement of a piston. $V'$ controls the piston $I'$, $V^4$ the piston $I^2$, $V^2$ the piston $N'$, and $V^3$ the piston $N^2$. The pistons $I'$ and $I^2$ are of larger area than $N'$ and $N^2$. In Fig. 2 the brushes are shown resting on the row of contacts B, which corresponds with the position illustrated in Fig. 8. To effect this, the coils $C^2 C^4$ are energized and draw in their cores against the force of the compression-springs $s^2 s^4$, thus raising the valves $V^2 V^4$, so that air is admitted to the back of the pistons $N' I^2$, respectively, as indicated by the arrows. The rod of the piston $I^2$ is of such length as to form a stop for the piston $N^2$, which piston is connected through the pitmen $P^2 P'$ to the piston $N'$. Thus the pressure behind the piston $N'$ tends to rotate the commutating-cylinder P counterclockwise; but the piston-rod of the piston $I^2$ stops the rotation at such point that the brushes rest upon the row of contacts B. By reason of its greater area the piston $I^2$ thus acts as a positive stop for the smaller piston $N^2$. Exhaust-ports (lettered $v'$ to $v^8$, respectively) permit the discharge of the pressure whenever they are opened by the movement of any one of the balanced valves $V'$ to $V^4$. For instance, in Fig. 2 when the piston $N^2$ begins to move to the right any pressure behind it is released through the ports $v^3$, the valve $V^3$ serving to open this port, as well as the inlet-channel in the rear of the piston. So, also, if the valve $V^4$ drops, as when current ceases in the coil $C^4$, the port $v^4$ in the valve-chamber is opened, and the piston $I^2$ may then move back. The ports $v^5$ to $v^8$ are arranged in the lower ends of the valve-chambers, so as to prevent any dash-pot action from suction, and inasmuch as it is impossible to always prevent leakage this also obviates any difficulty from air creeping past the valve into the lower part of the chamber. If the row of contacts A is to be brought under the brushes, the coils $C^3 C^4$ are energized, thus admitting air to the back of the piston $N^2$, which passes to the end of its stroke and sets the contacts A and brushes in operative relation, the exhaust-ports above described permitting the discharge of the pressure behind the piston $N'$. This arrangement is shown in Fig. 3, and it will be unnecessary to further describe it. It is obvious that if the coils $C' C^3$ be actuated the row of contacts C will be brought under the brushes, the arrangement being the converse of that shown in Fig. 2, and similarly by energizing $C' C^2$ the contacts D will be brought under the brushes, this being the converse of the arrangement shown in Fig. 3.

Fig. 4 shows the arrangement of the electrical circuits when my invention is applied to a train composed of a number of independent units.

Figs. 5, 6, and 7 show the motor combinations of a single car. These will be more fully referred to in connection with Fig. 8, which shows the means by which these combinations are effected. In brief they show the motors of a four-motor car connected in series in two independent groups of two in multiple, Fig. 5, and this arrangement is changed to four motors in multiple for higher speeds, Fig. 6.

Fig. 7 shows the arrangement of the motors when used as braking-generators.

Fig. 8 shows the arrangement of the circuits of a single car. $M' M^2 M^3 M^4$ are four motors, and $B' B^2 B^3 B^4$ are four magnetically-actuated braking devices or brake-shoes. A number of single contacts $ma, mb, mc$, &c., operated by fluid-pressure and controlled by electromagnetic means, as shown at $m$, Fig. 1, are grouped to form a single switch Z, which acts to vary the resistance of the motors and to connect them in series groups and in multiple, as desired. A cylinder-switch P, the mechanical construction of which has been described above in connection with Figs. 2 and 3, acts to determine the direction of rotation of the motor and also to connect the machinery of the vehicle for power or braking. K, L, and RS are master-controller switches, the function of which is to control the position of the contacts of the motor-controller switches Z and P. K is the power-switch, L the brake-switch, and RS the reversing-switch. The switch P is shown with twenty-six stationary brushes numbered "25" to "50" and four rows of movable contacts A B C D. These rows of contacts correspond, respectively, to the forward brake, forward power, backward power, and backward brake positions. In the drawings the brushes 25 to 50 are shown in the forward power positions bearing on the contacts B. A cable Y extends through the car, connecting at each end to similar cables on the other cars. One set of contacts for these connections is shown at W, while the cable itself is shown in diagram in Fig. 4.

The motors of the train are divided into sets, each set preferably consisting of the motors of a single car and being preferably provided with its own current-collecting device or devices T and its own motor-controller Z P. Situated at selected points on the train I provide one or more master-controllers K L RS, connected to the cable Y in multiple. I prefer to provide a master-controller at each end of each car. In any car each master-controller controls all of the motor-controllers of the train, so that when one is in use the others should be left in the off positions. The various switches K L RS of the master-controllers are preferably interlocked, as is well understood in the art. In the position shown current enters at T and divides, the motor-current passing through the circuit-breaker CB to the contact 25 upon the commutating-switch P and the controlling-current to the contact 1 of the controller K and also to the reversing-switch RS. If the reversing-switch blade rests on contact 51, which corresponds to the forward position of the master-controller, current will flow from 51 to the coil $C^4$ and thence to earth and also through contact 13 upon the switch L, and by the cross connection to contact 12 upon that switch current will flow to the coil $C^2$ and thence to earth. This places the switch P in the forward power position, as explained above with reference to Figs. 2 and 3. The supply of current to the motor-circuits is governed by the controlling-switch Z, the contacts of which are, as already explained, operated by fluid-pressure and controlled by electromagnetically-operated valves. Current is supplied to operate the valves through the power-switch K of the master-controller. This switch is for convenience in illustration shown with its fixed and movable contacts developed on a plane surface, although in actual construction the movable contacts represented by the rectangles are ordinarily mounted upon the surface of the cylinder and are brought into contact with the row of fixed brushes represented by the small circles as the said cylinder is rotated. When the power-switch K is moved into its first operative position, with the fixed contacts 1, 2, and 10 resting upon the corresponding movable contacts, a circuit is closed from the trolley-shoe T to the fixed contact 1 of the power-switch, where it divides, one path leading through the cross connections joining the movable contacts to fixed contact 2 and thence through coil $a$ to ground and the other path by way of similar cross connections leading to fixed contact 10 and thence through coil $i$ to ground. The energizing of the coils $a$ and $i$ will operate the bell-crank contacts $ma$ and $mi$ to bridge their adjacent contacts in the manner already explained in connection with Fig. 1. The operation of the contacts $ma$ and $mi$ of the controlling-switch Z closes a circuit from the trolley-shoe through the motors to ground, which may be traced as follows: starting from the trolley-shoe T through the circuit-breaker to contact 25 upon switch P, by way of cross-connected movable contacts on said switch to the contact 26, through resistance-section $R^a$ and the contacts bridged by the contact $ma$ to contact 27 upon switch P, at which point the circuit divides into two paths, one through the motor-armature $M'$ and the field $F'$ and the other through the motor-armature $M^2$ and the field $F^2$, these two paths uniting again at the ends of the respective field-windings. From this point the circuit leads through the contacts bridged by the bell-crank contact $mi$ to the contact 39 upon the switch P, at which point the circuit again divides into two paths, one passing through the motor-armature $M^3$ and the field $F^3$ to ground and the other through the motor-armature $M^4$ and the field $F^4$ also to ground. It will thus be seen that the motors $M'$ and $M^2$ are connected in multiple with each other and in series with the second group of motors $M^3$ and $M^4$, also connected in multiple. This is the arrangement shown in diagram in Fig. 5. Further manipulation of the power-switch K acts to cut in further sections of resistance in multiple by operating the levers $mb$ $mc$, &c., thus reducing the total resistance of the motor-circuit until finally $mg$ is operated, short-circuiting the resistances entirely. This occurs when the fixed contact 8 of the power-switch is brought into engagement with its corresponding movable contact. It should be noted that the resistances $R^a$ $R^b$ $R^c$, &c., are of different values, the first being the greatest, as is usual in controllers in which resistances are thrown in in multiple. A portion of the resistance is again thrown in by the further revolution of the contact-cylinder K, and the contact 11, which is brought into circuit before the circuit is opened at the contact 10, acts to establish a shunt around the second pair of motors by connecting the field-magnets $F'$ $F^2$ directly to earth through the contact $mj$. When contact 10 on the power-switch K is open-circuited, it will be found that the motors are all connected in multiple between the trolley and ground, contact 9 here closing a circuit, which throws the bell-crank contact $mh$, thus making a path directly from the resistance-leads to contact 39 upon the switch P, this path being in multiple with that through the contact 27 to the first pair of motors. The final steps of motor control are to connect in the resistances in multiple until finally the contact 8 again makes a circuit, which by closing contact $mg$ short-circuits all of the resistances. The multiple position of the motors is illustrated in Fig. 6. If when the car or train is in motion, with the circuit to the motors closed through the row of contacts B on the switch P, it is desired to operate the motors as braking-generators to retard the car or train, the switch P must be actuated to bring the row of contacts A under the brushes 25 to 50. To effect this, the power-switch K must first be moved to its open-circuit position (the position shown in Fig. 8) and the brake-switch L moved into its first operative position. In so moving the switch L the movable contacts of the said switch pass out of engagement with the fixed contacts 12 to 15, inclusive, on one side and are brought into engagement with contacts $12^a$ to $15^a$, inclusive, on the other side, other movable contacts being brought into engagement with fixed contacts $12^b$, $15^b$, 16, and 17. In this position of the braking-switch and with the reversing-switch RS occupying the position shown in Fig. 8 current will pass from the trolley to the lever of the switch RS and through the contact $51^a$, upon which the switch-lever rests, to contact $12^b$ through the cross-connected movable contacts on the switch L to contacts $12^a$ and $13^a$, from whence it will flow through the coils $C^3$ and $C^4$ to ground, thus, as explained in connection with Fig. 3, bringing the commutating-switch P to the forward braking position. The circuit connections in braking are shown in diagram in Fig. 7. In the ordinary operation of the motors the trolley-current passes through them in the direction shown by the arrows; but when they are operated as braking-generators current flows from them in the opposite direction. Starting at the brush marked $+$ of the motor M', current passes to contact 28 by contact 29, which is then on the row of contacts marked A; through the brake-shoe B', thence to contact 30 to the connection E. The motors $M^2$ $M^3$ $M^4$ are similarly connected to their respective brake-shoes. The brushes 32, 38, 44, and 50 are also connected by their contacts to the cross connection E, which acts as an equalizer, as shown in diagram in Fig. 7, between the ends of the fields and the brake-shoes. The fields F' $F^2$ are connected directly to the ground-wire GW, the bell-crank contact $mj$ closing the gap in the first position of the switch L. This bell-crank is operated by current from trolley, passing through the contacts 16 and 17 on the brake-switch and through the coil $j$ to ground. The fields $F^3$ $F^4$ are permanently connected to ground. The terminals marked $-$ of the respective armatures of the motors M' to $M^4$ are connected to the ground-wire through the resistances as follows: Contact 31 of the armature of motor M' is connected to the wire E', contact 37 similarly connects the second motor, contact 43 the third, and contact 49 the fourth. Finally, the wire E' is connected by the contact 27 to the resistance-lead, which is grounded through the resistance and contact 26, as shown, when any one of the coils $a$ to $f$ is energized and without resistance when the coil $g$ is energized. It will thus appear that in the first position of the brake-switch L all of the armatures are open-circuited; but when the contact 18 touches its corresponding contact on the switch the coil $a$ is energized and one section of the resistance is cut in, completing the circuit back to contact 26 and thence to the ground-wire. As before, the various resistances are cut in in multiple until finally the bell-crank contact $mg$ is thrown and the motors and brake-shoes are connected without external resistance, as shown in Fig. 7. It will be unnecessary to trace the connections in full for the different steps of resistance or for the other positions of the commutating-switch P. By an examination of the developed contacts indicated by the rectangular blocks it will be seen that they simply reverse the relation of the different armature and field terminals to accord with the proper direction of rotation. When the switch RS is thrown to the contact 52, it will be in the proper position to energize coils C' and $C^3$ and cause the brushes of the switch P to bear on the row of contacts C, reversing the motors. In the braking position, however, it will rest on contact $52^a$, and the first movement of switch L will energize the coils C' and $C^2$, thus bringing the contacts D under the brushes. The direction of current will in each case be opposite to that already described with reference to contacts B and A, respectively. As it is objectionable in the practical operation of the devices illustrated to let the current pass continuously through the different coils of the switch-operating contacts, I have so arranged the controlling devices as to cut out from time to time certain coils not actually needed in service. For example, I have so arranged the contacts and brushes 2 to 7 of the switch K that the circuits are opened at these points, and the corresponding coils $a$ $b$ $c$ $d$ $e$ $f$ are deënergized as soon as, by the operation of the contact-brush 8, the resistance-short-circuiting contact $mg$ is thrown. Therefore as soon as the resistances $R^a$ to $R^b$ are short-circuited the coils which operate these contacts cease to carry current. This result takes place in passing to the last series position and also in passing to the last multiple position. Similarly, I arrange the contacts upon the switch L so that the circuits of the coils C' to $C^4$ are opened after such time as will insure the proper operation of the switch P, the contacts $12^b$ and $15^b$ being cut off, so that their respective brushes cease to furnish them with trolley-current.

I have shown the contacts 51 and 52 of the reversing-switch RS somewhat elongated and have so arranged the switch that it is "overset"—that is, it cannot permanently remain on either of these contacts, but must pass to one of the stops $x'$ $x'$, urged by a suitable spring, as shown in the drawings. I also provide the switch with two dash-pots DP, each of which is provided with two apertures for regulating the escape of air. One of the apertures of each dash-pot is of fairly large size, so that the switch may move promptly in closing the contact, while the other is smaller, so that the switch may move more slowly as it passes over either of the contacts 51 and 52. The result is that in passing either way the switch-blade rests long enough on the desired contact 51 or 52 to cause the proper operation of the switch P through the action of the coils C' C² C³ C⁴, but that these coils are deënergized during the passage of the switch RS from one position to another. In order that the dash-pots may not retard the switch by suction, the smaller of these apertures is placed in a valve V^a, which closes as the dash-pot piston moves outward, but leaves it free to move in the other direction. The final position of the switch RS in either direction will be upon one or the other of the contacts 51^a 52^a, the stops $x'$ preventing their leaving these contacts under the pull of the spring. By tracing the connections to the switch L it will be seen that the circuit of these contacts is opened there, so that the coils C' to C⁴ are not energized until the latter switch is brought to its first position. In the first position of switch L the circuits made by contacts 12^b to 15^b are closed before the contact 18 supplies trolley-current to the coil $a$. This closure effects the operation of the switch P sufficiently in advance of the closing of any of the circuits which include the coils $a$ to $j$ of the main controller Z to prevent improper actuation of the latter. Of course this overlap may be anything desired. In the mechanical embodiment of the switch P any of the usual expedients for making such switches operate successfully may be employed. They require no detailed description. With the arrangement of contacts just described, the coils C' to C⁴ being idle, the various pistons of the pneumatic device would be free to move, so that ordinarily it is well to provide the usual step-by-step device having four defined positions in which the switch P will be held. If desired, the blade of the switch RS might rest upon one or the other of the contacts 51 52 and not pass off them, as in the construction illustrated. In this case the pistons would be held in place by the air-pressure and two of the coils C' to C⁴ would always be in circuit. I have not deemed it necessary to particularly illustrate this arrangement, as it is apparent from the present drawings. The step-by-step device would evidently be unnecessary with this arrangement of the apparatus.

I have not attempted to indicate in the drawings every detail of manufacture, as these would vary indefinitely. The usual insulation will be applied wherever needed, parts made adjustable and interchangeable to compensate for wear, and such usual provisions made as may be desirable. So I have not considered it necessary to describe other loads for the motors than a car or train. My invention has its greatest utility in this connection; but it may well be applied wherever a number of motors are to be effectively controlled.

It is one advantage of the controller system which I have devised that when for any reason the power-circuit is interrupted the motor-circuits are also instantaneously interrupted. If now it is desired that upon the restoration of the circuit the motor-controllers shall be simultaneously placed in the position which they occupied before the interruption, (as would be the case where the interruption was only momentary, such as that caused by the presence of ice or paper upon the third rail,) the motorman has simply to leave the controller in position and the result will be effected. If, however, the interruption is continuous for such a time that the speed of the motors materially decreases, it is only necessary for the motorman to place the master-controller in the position corresponding to that which he wishes the motor-controllers to assume when the circuit is restored. The motor-controllers will then immediately upon restoration take the desired position. It should also be noticed that in my improved system of control the motor-controllers and master-controllers are in positive synchronous relation, so that when the master-controller is placed in any position the motor-controllers immediately assume the corresponding position without any appreciable time interval intervening and that any motion of the master-controller forward or back one notch or several notches will be instantaneously and accurately responded to by the motor-controllers. This is accomplished or facilitated by the localization of the air-pressure in the reservoir upon each car, by which there is at all times such a full and sufficient supply of air that all of the mechanisms dependent upon it for action are moved quickly and effectively, so that there is in practice no time lag between the controller mechanisms upon the different cars.

What I claim as new, and desire to secure by Letters Patent of the United States, is—

1. In an electrically-propelled vehicle, the combination with the electrical devices, of an air-brake system, and means for controlling the electric circuit in response to changes of pressure in the air-brake system.

2. In an electrically-equipped vehicle or train, the combination of electrical apparatus and an air-brake system, with means for opening the electric circuit by the application of the air-brakes.

3. In an electrically-equipped vehicle or train, the combination with the motor-circuit, of an air-brake system, and connecting mechanism, so organized that the lowering of pressure in the air-brake system, as by applying the brakes, will open the motor-circuit.

4. In combination, one or more motors operatively connected to a load, an air-brake system therefor, a device for cutting off the supply of energy to the motors, and means operated by the pressure of the air in the air-brake system for controlling the operation of said device.

5. In a vehicle equipped with electric propelling-motors and with an air-brake system, a circuit-breaking device in the circuit of the propelling-motors, and means controlled by the pressure in the air-brake system for maintaining the said circuit-breaking device in its closed position.

6. In a vehicle equipped with electric propelling-motors and with an air-brake system, a circuit-breaking device in the circuit of the propelling-motors, and means controlled by the pressure in the air-brake system for actuating said circuit-breaking device to open the motor-circuit.

7. In a vehicle equipped with electric propelling-motors and with an air-brake system, a circuit-breaking device in the circuit of the propelling-motors, and means whereby the said device will not remain in its closed position until after the air-pressure in the brake system rises to a certain predetermined point.

8. In a vehicle equipped with electric propelling-motors and with an air-brake system, a circuit-breaking device in the circuit of the propelling-motors, means for closing said circuit-breaking device, and means controlled by the pressure in the air-brake system for holding said device closed whenever the pressure in the air-brake system is in excess of a certain critical pressure.

9. In a vehicle equipped with electric propelling-motors and with an air-brake system, a circuit-breaking device in the circuit of the propelling-motors, an operating-handle for the said circuit-breaking device by means of which it may be closed and held in its closed position, and means controlled by the pressure in the air-brake system for holding the said device closed whenever the pressure in the said system is in excess of a certain critical pressure.

10. In a vehicle equipped with electric propelling-motors and with an air-brake system, an automatic circuit-breaker in the circuit of the propelling-motors, and means operatively related to the air-brake system for tripping the circuit-breaker whenever the pressure in the said system falls below a certain predetermined point.

11. In a vehicle equipped with electric propelling-motors and with an air-brake system, an automatic circuit-breaker in the circuit of the propelling-motors, a tripping device therefor, and means controlled by the pressure in the air-brake system for operating said tripping device.

12. In a vehicle equipped with electric propelling-motors and with an air-brake system, an automatic circuit-breaker in the circuit of the propelling-motors, a tripping device therefor, and means controlled by the pressure in the air-brake system for holding said tripping device in an inoperative position until the air-pressure in the air-brake system rises to a certain critical point.

13. In a vehicle equipped with electric propelling-motors and with an air-brake system, an automatic circuit-breaker in the circuit of the propelling-motors, a tripping device for said circuit-breaker, and a fluid-controlled device operatively connected to the air-brake system and arranged to actuate the tripping device whenever the pressure in the air-brake system falls below a predetermined point.

14. In a vehicle equipped with electric propelling-motors and with an air-brake system, an automatic circuit-breaker in the circuit of the propelling-motors, a tripping device for the circuit-breaker, a piston controlled in its operation by the pressure in the air-brake system, and an operative connection between the piston and the tripping device.

15. In combination, a number of electric motors driving a common load, such as a vehicle or train, a controlling device for the motors, a source of fluid-pressure, mechanism actuated by the fluid-pressure and operating the motor-controllers, and means for electrically controlling the fluid-pressure mechanism.

16. A controller for electric motors, in combination with means operated by fluid-pressure for actuating the contacts of said controller, step-by-step and manually governed electromagnetic means for controlling the application of the fluid-pressure.

17. The combination with a motor system, of a motor-controller composed of a number of separate contacts actuated by fluid-pressure and a single commutating-switch, and electromagnetic means for determining the position of the contacts and of the switch.

18. The combination with a motor system, of a motor-controller composed of a number of separately-operated magnetically-controlled contacts for cutting in and out resistance and for making series-parallel connections and a single switch for determining the direction of running and for making braking connections, and a master-controller for determining the position of the contacts and of the switch.

19. The combination with a motor system, of a motor-controller composed of a number of separately-operated contacts and a single switch, means operated by fluid-pressure for actuating the contacts and the switch, a master-controller and electromagnetic means controlled by the master-controller for determining the position of the contacts and of the switch.

20. The combination, in an electrically-equipped apparatus, such as a vehicle or train, where a number of motors situated upon different parts of the apparatus are employed, of a controlling device for each motor or group of motors, the operation of which is effected by fluid-pressure, and electrically-controlled mechanism for causing the fluid-pressure to simultaneously operate the different controlling devices and thus shift the motor-circuits in the desired manner.

21. In an electrically-equipped train, provided with motors upon different vehicles, each of the motor-vehicles being provided with independent controlling or regulating apparatus for its motor-circuits, a source of fluid-pressure, such as an air-brake system, and an electrical controlling device simultaneously operating the controllers upon the different cars by the fluid-pressure.

22. A system of control for trains, composed of electrically-equipped units, in which each of the units is provided with a complement of motors and an independent individual motor-controller, comprising fixed and movable contacts actuated by fluid-pressure, and an electrical controlling system simultaneously and similarly regulating the admission and release of the fluid-pressure to the actuating mechanism of the different controllers.

23. In a train system for electrically-propelled vehicles, the combination of a plurality of controlling devices regulating the resistance of the various motor-circuits, and having individual contacts each of which is separately actuated by fluid-pressure from a convenient source, with a separate electrical switch and connections by which the admission and release of the fluid-pressure to the contacts of the different controllers of the car or train is simultaneously effected in any predetermined manner.

24. In an electrically-equipped car, the combination of a commutating-switch adapted in its different positions to connect the motors for forward or backward propulsion or braking, with a controlling-switch for controlling the power and speed of the motors or the output of the braking-generators, a source of fluid-pressure for actuating the switches and a controller for electrically regulating the application of the fluid-pressure.

25. In an electrically-equipped vehicle, the combination of a commutating-switch, determining in some of its positions the direction of rotation of the motors of the vehicle, and in other positions making connections for retarding the vehicle, with a controlling device so arranged as to change the resistance of the electric circuit in any desired manner, and electromagnetic means for controlling the switch and said controlling device from a distance 26. In an electrically-equipped vehicle, the combination of a commutating-switch, determining in some of its positions the direction of rotation of the motors of the vehicle, and in other positions making connections for retarding the vehicle, with a controlling device comprising a plurality of separate, individually-controllable actuating means actuating a plurality of contacts, so arranged as to change the resistance of the electric circuit in any desired manner.

27. In an electrically-equipped vehicle, the combination of a commutating-switch, determining in some of its positions the direction of rotation of the motors of the vehicle, and in other positions making connections for retarding the vehicle, with a controlling device so arranged as to change the resistance of the electric circuit in any desired manner, and means for controlling the action of the commutating-switch and controlling device from a distance.

28. In an electrically-equipped vehicle, the combination of means for determining the direction of rotation of the motors of the vehicle, and means for making connections for retarding the vehicle, with a controlling device comprising separately-actuated contacts, so arranged as to change the resistance of the electric circuit in any desired manner, and fluid-pressure mechanism controlled from a distance, for actuating the contacts and the said means.

29. In an electrically-equipped vehicle, the combination of a commutating-switch, determining in some of its positions the direction of rotation of the motors of the vehicle, and in other positions connecting them to act as braking-generators, with a controlling device arranged to change the resistance of the electric circuit and to bring about the series-parallel connections, and means for controlling the operation of the switch and controlling device from a distant point.

30. In a controller for electric motors, the combination of a plurality of separately-actuated contacts for regulating the motors when connected in a manner to propel the vehicle, a power-brake switch for partially completing the power and brake circuits, and electromagnetic means for controlling the operation of the contacts and switch.

31. In an electrically-equipped vehicle, the combination of a commutating-switch, determining in some of its positions the direction of rotation of the motors of the vehicle, and in other positions connecting them to act as braking-generators, with a controlling device comprising separately-actuated contacts, arranged to change the resistance of the electric circuit and to bring about the series-parallel connections, mechanism actuated by fluid-pressure for actuating the switch and contacts, and electromagnetic means controlled from one or more distant points for regulating the operation of the fluid-pressure.

32. In a motor system, the combination of a motor-controller provided with power, brake and reversing contacts, a source of fluid-pressure for operating said contacts, and a master-controller provided with power, brake and reversing contacts for controlling the corresponding contacts of the motor-controller.

33. The combination in an electrically-equipped apparatus, such as a vehicle or train, where a number of motors situated upon different parts of the apparatus are employed, of a motor-controller for each motor or group of motors, provided with power, brake and reversing contacts, a source of fluid-pressure for actuating said contacts, and a master-controller provided with power, brake and reversing contacts, each set of contacts arranged to operate the corresponding contacts of the motor-controller.

34. In an electrically-equipped train, a plurality of vehicles, each constituting an independent unit, and provided with a motor or motors, with a motor-controller comprising power, brake and reversing contacts, with a source of fluid-pressure for actuating the contacts, and with one or more master-controllers, provided with power, brake and reversing contacts, the arrangement being such that each of the master-controllers of the train is capable of controlling, through the operation of the fluid-pressure, the operation of all of the motor-controllers of the train.

35. In an electrically-equipped vehicle, the combination of a commutating-switch determining in some of its positions the direction of rotation of the motors, and in other positions causing them to act as braking-generators in either direction of motion, with a controlling device comprising separately-actuated contacts changing the resistance of the electric circuit in any desired manner, mechanism actuated by fluid-pressure for operating the commutating-switch and the different contacts of the controlling device, an electric switch for controlling the operation of the fluid-pressure while the motors are taking current, another switch for controlling the pressure when the motors are acting as braking-generators, and a reversing-switch controlling the fluid-pressure to shift the connections as desired.

36. The combination in a system of control for electric motors, of a controller composed of a number of separate contacts actuated by fluid-pressure for changing the resistance of the motor-circuit, a single commutating-switch or contact for changing the motor connections from series to parallel, and electromagnets for determining the position of the contacts and the switch.

37. The combination herein described for actuating a switch or other moving part by fluid-pressure, comprising two pistons having no mechanical connection between them, one of greater area than the other, the piston-rod of the larger piston acting as a stop for the smaller one, and valves for controlling the admission or release of fluid-pressure to the cylinders.

38. The combination herein described for actuating a switch or moving part by fluid-pressure, comprising two pistons, one of greater area than the other, the piston-rod of the larger piston acting as a stop for the smaller one, valves for controlling the admission or release of fluid-pressure to the cylinders, electromagnets for controlling the valves, and a switch for regulating the electromagnets.

39. The combination in an electric controlling device, of terminals at which an arc may be formed, a contact for closing or opening the circuit at the terminals, actuated by fluid-pressure, and means for passing the exhaust from the contact-actuating device across the terminals to extinguish any arc that may be formed.

40. In combination, in an electric controlling device, contact-terminals, a fluid-pressure-controlled means for closing a circuit through said terminals and means for passing the exhaust-fluid across the said terminals at the time when the circuit is being broken.

41. In combination, in a motor-controller, means actuated by fluid-pressure for operating said controller and means for passing the exhaust-fluid across the contacts of the controller to extinguish any arcs that may be formed.

42. In a vehicle propelled by one or more electric motors and provided with air-brake mechanism, the combination with a motor-controller, of mechanism for operating said controller connected to a source of fluid-pressure, electromagnetic means for controlling the application of fluid-pressure to said operating mechanism and means for automatically opening the motor-circuit, depending directly upon the application of the air-brake.

43. In an electropneumatic operating and controlling system for vehicles, the combination with the power-circuit and the air-brake system, of means actuated by change of pressure in the air-brake system to automatically break the power-circuit as the brakes are applied.

44. In an electrically-equipped vehicle, the combination of an air-brake mechanism having a train-pipe, a circuit-breaker in the main motor-lead, a tripping device in the circuit-breaker, and a connection between a piston actuated by train-pipe pressure and the tripping device, such that upon failure of pressure, the circuit-breaker will be opened.

45. In an electric controller, the combination of a source of fluid-pressure, a piston, a weighted lever operated thereby, a moving contact, a lost-motion connection between the lever and contact, and means for controlling the action of the fluid-pressure upon the piston.

46. In a device for controlling the application of a fluid such as air under pressure, the combination of a plurality of valves for admitting or cutting off the fluid-supply, a plurality of contacts each controlled by a separate valve, electromagnets for controlling the valves, and a switch for including one or more of the electromagnets in circuit with a source of electric current.

47. A device for controlling the application of a fluid, such as air under pressure, comprising valves for admitting or cutting off the fluid-supply, electromagnetic devices for controlling the operation of the valves, and a switch for including the electromagnetic devices in any desired order or combination in a circuit from a suitable source of electric current.

48. The combination with a coil or coils actuating a mechanism of any type, of a switch controlling the circuit of said coil or coils, means operating to close and then to open said switch, and means arranged to restrain the action of the operating means while the switch is in its closed position, whereby a time allowance will be secured in the closed position of said switch without affecting its prompt closure.

49. In an electric switch, the combination of a moving terminal having an off position or positions in which it is normally retained, one or more elongated contacts in the path of the moving terminal, and retarding means acting upon the moving terminal while passing over the elongated contacts and leaving it free to move at other times.

50. In an electric switch, the combination of an "overset" moving terminal having two off positions, in one or the other of which it is normally retained, in combination with elongated contacts, one or more, in the path of the moving terminal, and a dash-pot connected to said terminal and affecting its motion while passing over the elongated contacts, all arranged to secure a time allowance in the closed position of the switch, without interfering with its prompt closure.

51. The combination with a number of coils which when energized actuate any desired mechanism, of a switch having one or more terminals connected to the coils, and a retarding means connected to the moving terminal of the switch, so arranged that the switch will promptly close, secure a time allowance in its closed position, and finally open.

52. The combination in an electric apparatus, of a switch for shifting the motor-circuits, electromagnetic mechanism operating the switch, a second switch having fixed contacts connected to the electromagnet-coil, a moving contact, and a retarding means acting upon the moving contact, while the latter is passing over the fixed contact, but leaving it otherwise free to move, whereby the correct position of the motor-controlling switch is secured by giving a time allowance to the electromagnetic mechanism.

53. In a controlling device operating a number of resistances, the combination of a number of separately-actuated contacts for including the resistances in circuit as desired, a contact for short-circuiting them, and means for opening the resistance-contacts when the short-circuiting contact is operated.

54. In a system of electric connections, a number of circuits, a switch having contacts for closing the circuits successively, a short-circuiting contact, and means for opening a desired number of the other circuits when the short-circuiting contact is closed.

55. In a controlling apparatus employing a plurality of contacts, the operation of which is electromagnetically controlled, means for opening the circuit or circuits of any electromagnets when the contacts controlled thereby have been rendered substantially inoperative by the actuation of other contacts.

56. In a controlling device operating a number of resistances, the combination of contacts for including the resistances in circuit as desired, a contact for short-circuiting some or all of the resistances, means for opening the circuit of the short-circuited resistances, and means for including the resistances again in circuit when the short circuit is opened.

57. In a controlling device for electric motors having separate electromagnetically-operated contacts for regulating the circuit of the motors, the combination of means for short-circuiting some of the contacts with means for then deënergizing the magnet-coils of the contacts which are short-circuited; whereby the electromagnet-coils carry current only while the contacts which they respectively operate are required to be in circuit.

58. In a controlling device having separate electromagnetically-operated contacts, the combination of a switch for connecting the coils of the electromagnets in any desired manner, and connections for short-circuiting some of the contacts operated by the coils; the arrangement of the switch and its coöperating contacts being such that the circuits of the electromagnet-coils operating the short-circuited contacts are opened during the time the contacts are short-circuited, so that the coils carry current only while their respective contacts are required to be in circuit.

59. In a switch for connecting the coils of electromagnets, a coil operating a contact making a short circuit around one or more contacts operated by the switch, and contacts and connections whereby a desired number of the short-circuited contacts are opened when the short-circuiting contact is thrown, and closed when the short-circuiting contact is opened.

60. In a controller system, the combination of a master-controller, a motor-controller containing a plurality of separately-actuated contacts for making the series-parallel connection, and a switch independent of said contacts, means for operating the contacts and the switch, and means controlled by the master-controller for regulating the action of the separate contacts and also of the switch.

61. In a controller system, the combination of a master-controller, a motor-controller containing a plurality of separately-actuated contacts for making the series-parallel connection, and a switch independent of said contacts, means for operating the contacts and the switch, and electromagnetic means whereby the master-controller regulates the action of the separate contacts and also of the switch.

62. In a train system, the combination of a number of motor-vehicles, a motor-controller for each motor-vehicle, comprising a plurality of switches, a plurality of master-controllers each containing a switch corresponding to each switch of any one of the motor-controllers, and connections such that the operation of any one of the master-controller switches will cause the operation of the corresponding switch of each one of the motor-controllers.

63. In a train system, the combination of a number of motor-vehicles, a controller for each motor-vehicle, comprising a plurality of switches, a master-controller for each motor-car comprising a plurality of switches corresponding to those of the motor-controller, electrical connections between the master and motor controller switches, whereby the operation of the motor-switches is controlled, and electrical connections between the corresponding master-controller switches of the train.

64. In a train system, the combination of a number of motor-cars, each provided with a master-controller comprising power, reversing and brake contacts, a motor-controller comprising power, reversing and brake contacts, and means controlled by each one of the master-controllers for operating all of the motor-controllers.

65. In a motor-regulating system, a number of motors or sets of motors in different locations with independent fluid-pressure-actuated regulating mechanisms for each motor or set, and means controlled from one or more distant points for regulating at the several controllers the action of the fluid-pressure.

66. In a motor-regulating system, a number of motors or sets of motors each of which is regulated by an independent controlling mechanism, separate sources of fluid-pressure directly connected to the several controlling mechanisms, and means for controlling the pressure from a desired point or points.

67. In an electrically-propelled vehicle or train, a number of motors located in sets in different places upon the vehicle or train, each set being provided with a fluid-pressure-actuated controlling mechanism, separate sources of fluid-pressure directly connected to the several controlling mechanisms, and means for controlling the action of the fluid-pressure from all of the sources from a desired point or points upon the vehicle or train.

68. In a train-control system, a number of motor-vehicles, each provided with a plurality of motors and controlling mechanism regulating only the motor or motors upon its own car, separate sources of fluid-pressure upon each vehicle directly connected to the controlling apparatus thereon, and means at one or more points upon the train for simultaneously regulating the fluid-pressure upon each of the vehicles so as to regulate the different motors throughout the train simultaneously and practically without lag.

69. In an electrically-propelled train, the combination of a number of motor-vehicles, each equipped with its own motors and controlling devices, fluid-pressure apparatus, such as an air-brake system, for regulating the action of the controllers, separate sources of fluid-pressure upon each of the vehicles, each localized to actuate desired parts of the controlling apparatus of its own vehicle, and electrically-operated means controllable from one or more points upon the train for regulating the action of the fluid-pressure to obtain substantially synchronous control of the motor-circuits, as described and for the purpose set forth.

70. In a motor-controlling apparatus, the combination of a switch having four positions and circuits controlled by the switch for shifting the motor relations, with fluid-pressure apparatus for causing the switch to assume a desired position, valves for controlling the fluid-pressure, electromagnets for operating the valves, and a switch or switches at desired points, controlling the circuits of the electromagnets.

71. A switch-actuating mechanism, comprising a plurality of cylinders, pistons for said cylinders operatively connected to said switch, valves and electromagnets for positively actuating said valves so as to apply fluid-pressure and thereby effect the operation of the switch in either direction at will.

72. A switch-actuating mechanism comprising two pistons operatively connected to said switch, a cylinder for each piston having an exhaust-port normally in operative condition, valves for closing said exhaust-port and for admitting fluid-pressure, and an electromagnet for actuating said valves.

73. In a switch-actuating mechanism, in combination, two pistons operatively connected to said switch, a cylinder for each piston having an exhaust-port normally in operative condition, and means actuated at will to close the exhaust-port and admit fluid-pressure to either cylinder.

74. In a switch for electric circuits having a plurality of operative positions, the combination of a piston operatively connected to said switch, a cylinder for said piston, means actuated at will for supplying pressure to said cylinder to move said switch into one of its operative positions, and means actuated at will for positively arresting said piston in an intermediate position in its cylinder to cause said switch to assume another operative position.

75. In a switch for electric circuits having a plurality of operative positions, the combination of two pistons operatively connected to said switch, a cylinder for each piston having an exhaust-port normally in operative condition, means actuated at will for closing the exhaust-port and supplying pressure to either of said cylinders and means actuated at will for positively arresting either of said pistons in an intermediate position in its cylinder.

76. In combination, a controller having a plurality of separate contacts, separate fluid-pressure devices for actuating said contacts, electromagnets for controlling the operation of the fluid-pressure devices, a system of conductors to which the windings of said electromagnets are connected, and a master-switch, located at any desired point, having its contacts arranged to supply current from a suitable source to the system of conductors to which the windings of the electromagnets are connected.

77. The combination of a controller, a series of fluid-pressure-actuated devices for operating said controller, and electrical means for controlling said series of devices.

In witness whereof I have hereunto set my hand this 6th day of April, 1899.

WILLIAM B. POTTER.

Witnesses:
BENJAMIN B. HULL,
MABEL E. JACOBSON.